US011042509B1

(12) United States Patent
Vining et al.

(10) Patent No.: US 11,042,509 B1
(45) Date of Patent: Jun. 22, 2021

(54) MOBILE LEARNING SYSTEM

(71) Applicant: ADP, LLC, Roseland, NJ (US)

(72) Inventors: Kyle Vining, Marlborough, MA (US); Kazim Jawwad Syed, Marlborough, MA (US); Elaine Clement, Los Angeles, CA (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 16/830,695

(22) Filed: Mar. 26, 2020

(51) Int. Cl.
*G06F 16/16* (2019.01)
*H04L 29/08* (2006.01)
*G06F 3/0485* (2013.01)
*G06F 3/0482* (2013.01)

(52) U.S. Cl.
CPC .......... *G06F 16/168* (2019.01); *G06F 3/0482* (2013.01); *G06F 3/0485* (2013.01); *H04L 67/02* (2013.01)

(58) Field of Classification Search
CPC .... G06F 16/168; G06F 3/0482; G06F 3/0485; G09B 5/06; H04L 67/02
See application file for complete search history.

(56) References Cited

U.S. PATENT DOCUMENTS

| | | | | |
|---|---|---|---|---|
| 6,471,521 B1 * | 10/2002 | Dornbush | ................ | G09B 5/14 434/322 |
| 9,524,341 B2 * | 12/2016 | Pulnikova | ............. | G06F 16/951 |
| 2006/0248475 A1 * | 11/2006 | Abrahamsson | .... | H04N 21/4312 715/835 |
| 2017/0124894 A1 * | 5/2017 | Essafi | ..................... | G06Q 10/00 |
| 2019/0319812 A1 * | 10/2019 | Vargo | .................... | H04L 67/306 |

* cited by examiner

*Primary Examiner* — Namitha Pillai
(74) *Attorney, Agent, or Firm* — Yee & Associates, P.C.

(57) ABSTRACT

A method of providing learning content on a mobile device. The method comprises receiving a user selection, through an interface on the mobile device, of a folder in a catalog of learning courses, wherein the catalog comprises a number of nested folders within a hierarchical file structure. It is determined if the selected folder contains nested folders. If the selected folder contains nested folders, the nested folders are displayed in the interface. If the selected folder does not contain nested folders, a number of learning courses in the selected folder are displayed in the interface. In response to receiving a user selection of a learning course in the selected folder, the contents of the selected learning course are displayed in the interface.

20 Claims, 11 Drawing Sheets

MOBILE LEARNING SYSTEM

BACKGROUND INFORMATION

1. Field

The present disclosure relates generally to an improved computer system and, in particular, to learning courses accessible via mobile devices.

2. Background

Education and employee training are increasingly moving toward online learning. Online learning often provides more convenient access and opportunities than classroom learning and is not limited to the geographical location of the user.

Online learning course material can be displayed on a number of different kinds of devices that are able to access computer networks such as the worldwide web. Online content is often displayed differently on different types of devices. For example, web pages often have different formats for web browsers on desktop versus mobile phones.

SUMMARY

An illustrative embodiment provides a computer-implemented method of providing learning content on a mobile device. The method comprises receiving a user selection, through an interface on the mobile device, of a folder in a catalog of learning courses, wherein the catalog comprises a number of nested folders within a hierarchical file structure. It is determined if the selected folder contains nested folders. If the selected folder contains nested folders, the nested folders are displayed in the interface. If the selected folder does not contain nested folders, a number of learning courses in the selected folder are displayed in the interface. In response to receiving a user selection of a learning course in the selected folder, the contents of the selected learning course are displayed in the interface.

Another embodiment provides a system for providing learning content on a mobile device. The system comprises a storage device configured to store program instructions and one or more processors operably connected to the storage device and configured to execute the program instructions to cause the system to: receive a user selection, through an interface on the mobile device, of a folder in a catalog of learning courses, wherein the catalog comprises a number of nested folders within a hierarchical file structure; determine if the selected folder contains nested folders; if the selected folder contains nested folders, display the nested folders in the interface; if the selected folder does not contain nested folders, display, in the interface, a number of learning courses in the selected folder; receive a user selection, through the interface, of a learning course in the selected folder; and display contents of the selected learning course in the interface.

Another illustrative embodiment provides a computer program product for of providing learning content on a mobile device. The computer program product comprises a non-volatile computer readable storage medium having program instructions stored thereon to perform the steps of: receiving a user selection, through an interface on the mobile device, of a folder in a catalog of learning courses, wherein the catalog comprises a number of nested folders within a hierarchical file structure; determining if the selected folder contains nested folders; if the selected folder contains nested folders, displaying the nested folders in the interface; if the selected folder does not contain nested folders, displaying, in the interface, a number of learning courses in the selected folder; receiving a user selection, through the interface, of a learning course in the selected folder; and displaying contents of the selected learning course in the interface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that education and training are increasingly moving toward online learning. Online learning course material can be displayed on a number of different kinds of devices that are able to access computer networks such as the worldwide web.

The illustrative embodiments recognize and take into account that Online content is often displayed differently on different types of devices. The illustrative embodiments recognize and take into account that mobile devices typically have smaller areas in which to display course content, which requires a more economical use of display space. The illustrative embodiments recognize and take into account that online content is often not formatted to allow efficient display and navigation through course materials.

The illustrative embodiments provide an online catalog of learning courses that are accessible by mobile devices. The catalog comprises a number of nested files in a hierarchical file structure through which a user can navigate to select learning courses related to a subject of interest to the user. As the user selects nested folders, the user progressively drills down to lower levels in the file structure. The contents of each folder might be displayed on a scrollable menu such as a carousel menu in the mobile interface. The user might have the option of navigating back through higher file levels sequentially or randomly. The economize display space, random navigation can be provided through as action sheet that be accessed with a menu button.

Figure 1:
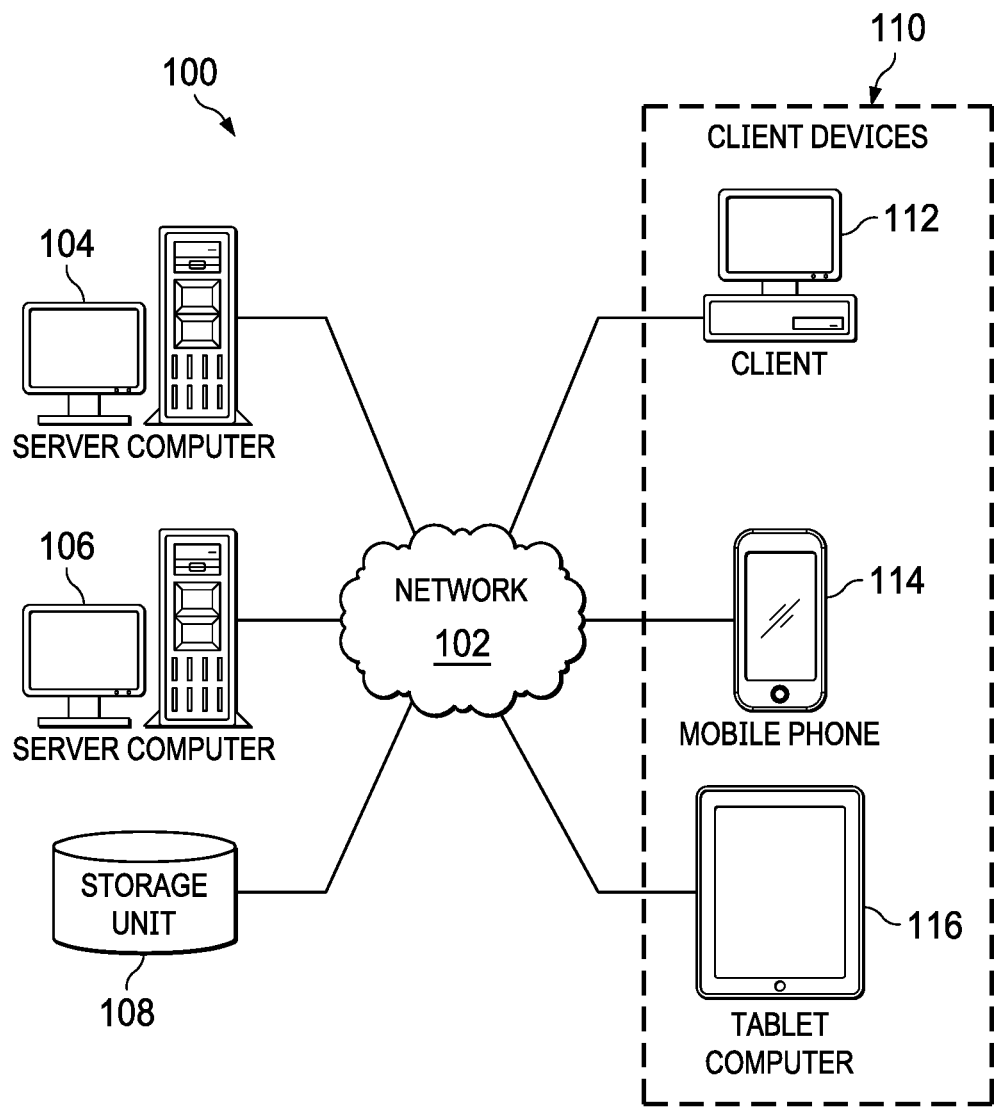
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or mobile devices. As depicted, client devices 110 include client computer 112, mobile phone 114, tablet computer 116. Other client devices might include laptop/notebook computers and smart classes.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 might include additional server computers, client computers, and other devices not shown. Client devices 110 might connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 might also be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Illustrative embodiments can be implemented in network data processing system 100. For example, mobile phone 114 and tablet computer 116 might include an interface for mobile learning content. Mobile learning course content can be located on a server such as server 104 or server 106 or distributed across multiple serves. Communication of course content and mobile interface inputs can be communicated over network 102 with a TCP/IP protocol.

Figure 2:
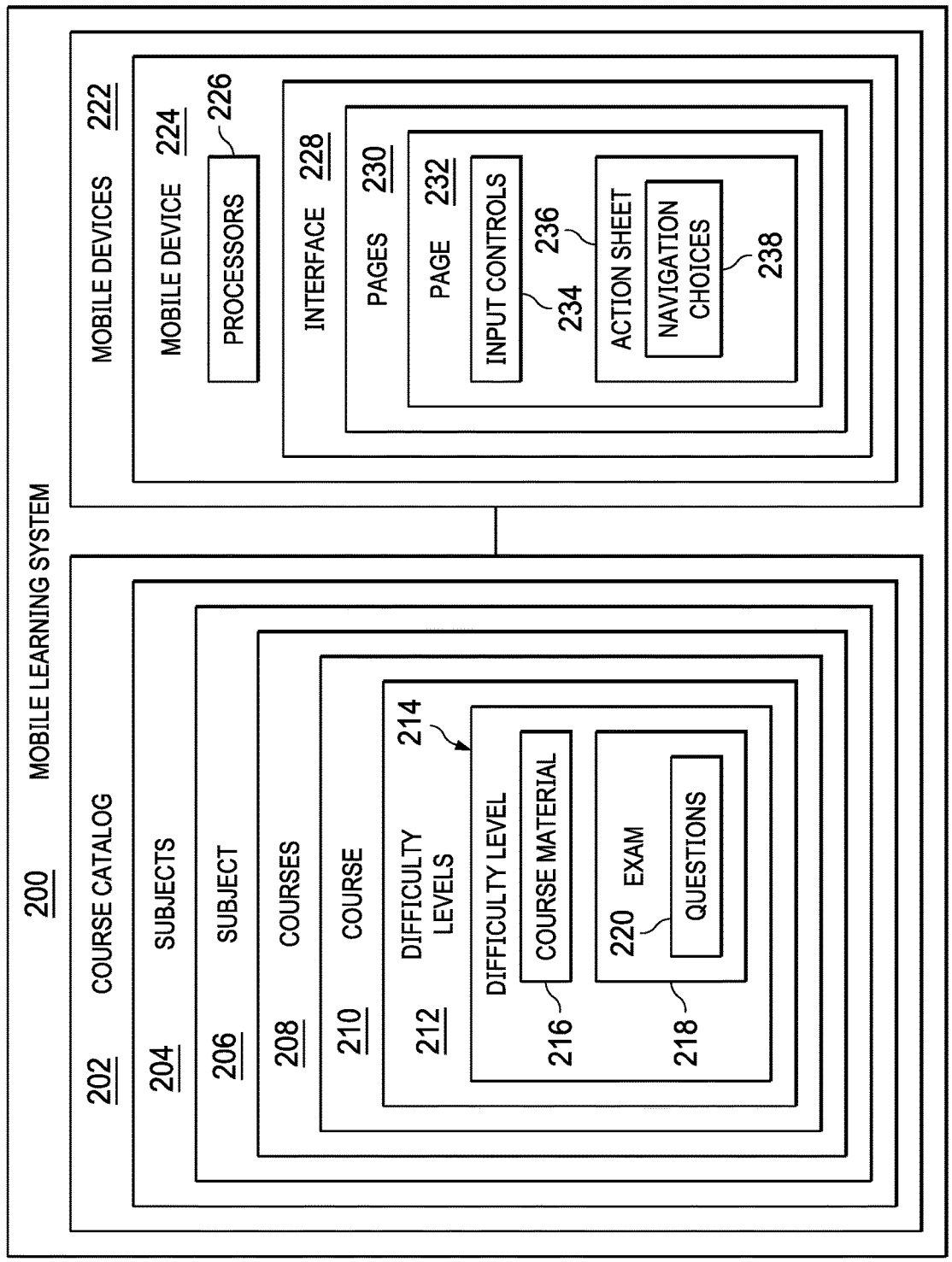
FIG. 2 is an illustration of a block diagram of a mobile learning system depicted in accordance with an illustrative embodiment.

Turning to FIG. 2, a block diagram of a mobile learning system is depicted in accordance with an illustrative embodiment. Mobile learning system 200 might comprise a course catalog 202 and mobile devices 222 that can access the course catalog 202. Course catalog 202 might be stored in storage unit 108 and implemented in server 106 in FIG. 1. Similarly, mobile devices 222 might comprise network client devices 110 in FIG. 1 such as mobile phone 114 or table computer 116.

Course catalog 202 might be divided into a number of subjects 204 about which a user wished to learn. For example, catalog 202 might include courses covering design, software development, networking, etc. Each subject 206 in subjects 204 might comprise a number of courses 208 related to that subject. For example, if the subject is design, the courses might cover different design software applications or different uses for a given application.

Each individual course 210 within courses 208 might comprise a number of difficulty levels 212, such as beginner, intermediate, or advances, according to the needs of users. Each difficulty level 214 in turn comprises specific course material 216 tailored to that difficulty level. Course 210 might also comprise an exam 218 with corresponding questions 220 appropriate for the difficulty level 214 in question.

Figure 3:
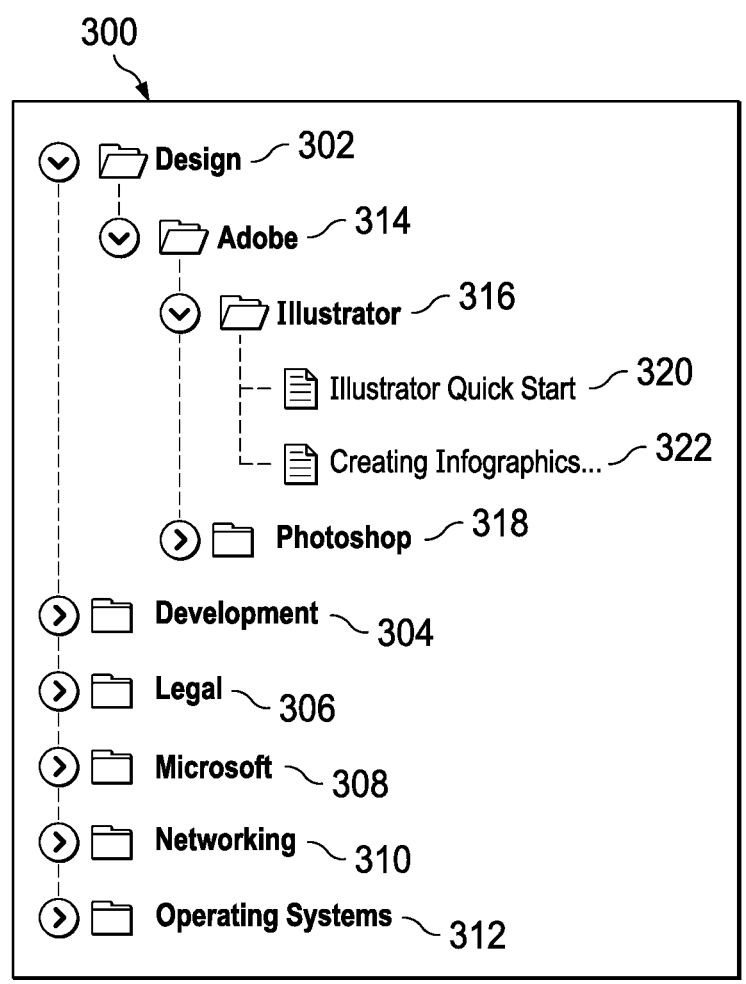
FIG. 3 is an illustration of a hierarchical file structure comprising nested files in accordance with an illustrative embodiment.

Course catalog 202 and courses 208 comprise a number of nested folders within a hierarchical file structure containing course content, as illustrated in the example show in FIG. 3. As users access the nested folders, they progressively drill down to lower levels in the file structure.

A number of mobile devices 222 might access course catalog over a wireless network such as network 102 in FIG. 1. Each mobile device 224 comprises one or more processors 226 configured to run software related to accessing and using courses 208 in catalog 202.

Interface 228 displays course material 216 on mobile device 224 and allows the user to interact with the course material 216 and exam questions 220 using input controls 234. Because space is at a premium when working with mobile devices, such as mobiles devices 222, interface 228 is able to display a number of different pages 230 for content as the user drills down through the hierarchical file structure. Each selection of a nested folder by the user might pull up a unique page 230 in interface 228. Each page 232 comprises input controls 234 that allow the user to, e.g., select deeper nested files or answer exam questions.

To navigate back up to higher level files in the hierarchical file structure, the user can call up an action sheet 236 in interface 228. Action sheet 236 comprises selection choices 238 that allow the user to navigate back through the file levels. The action sheet 236 and its associated navigation choices 238 are unique to the page 232 the user is viewing in interface 228 because the navigation choices are relative to the hierarchical file level displayed on page 232. The action sheet 236 allows navigation back to higher levels sequentially or randomly (skip file levels), depending on user needs and convenience.

In the case of an exam 218, action sheet 236 and navigation choices 238 enable navigation back to previous questions in the exam is performed. Again, the action sheet 236 allows navigation to previous questions sequentially or randomly.

FIG. 3 is an illustration of a hierarchical file structure comprising nested files in accordance with an illustrative embodiment. Catalog 300 might be an example of course catalog 202 in FIG. 2. Catalog 300 is divided into a number of different learning topics. In the present example, the topics include design 302, development 304, legal 306, Microsoft® 308, networking 310, and operating systems 312.

Each topic includes a number of courses the user can access. In FIG. 3, under design 302, the user might select courses covering the use of Adobe® software products 314. As shown, catalog 300 includes courses for Adobe Illustrator® 316 and Adobe Photoshop® 318. In the present example, the user has chosen the Adobe Illustrator® course 316, which includes an Illustrator Quick Start section 320 and a Creating Infographics section 322 from which the user can choose. Each course might be divided into beginner, intermediate, and advanced levels.

It should be understood that course catalog 300 might contain more or less learning topics and course than that shown in FIG. 3. FIG. 3 is intended to illustrate the nature of the nested folder used in creating the learning catalog. Catalog 300 might be a preexisting, preset catalog. In an embodiment, the user has the option to customize catalog 300 and create any number of nested folders the user wants according to the user's needs.

FIGS. 4-8 depicts interface displays for different levels within the hierarchical, nested filed structure. FIGS. 4-8 might be examples of pages 230 displayed in interface 228 in FIG. 2.

Figure 4:
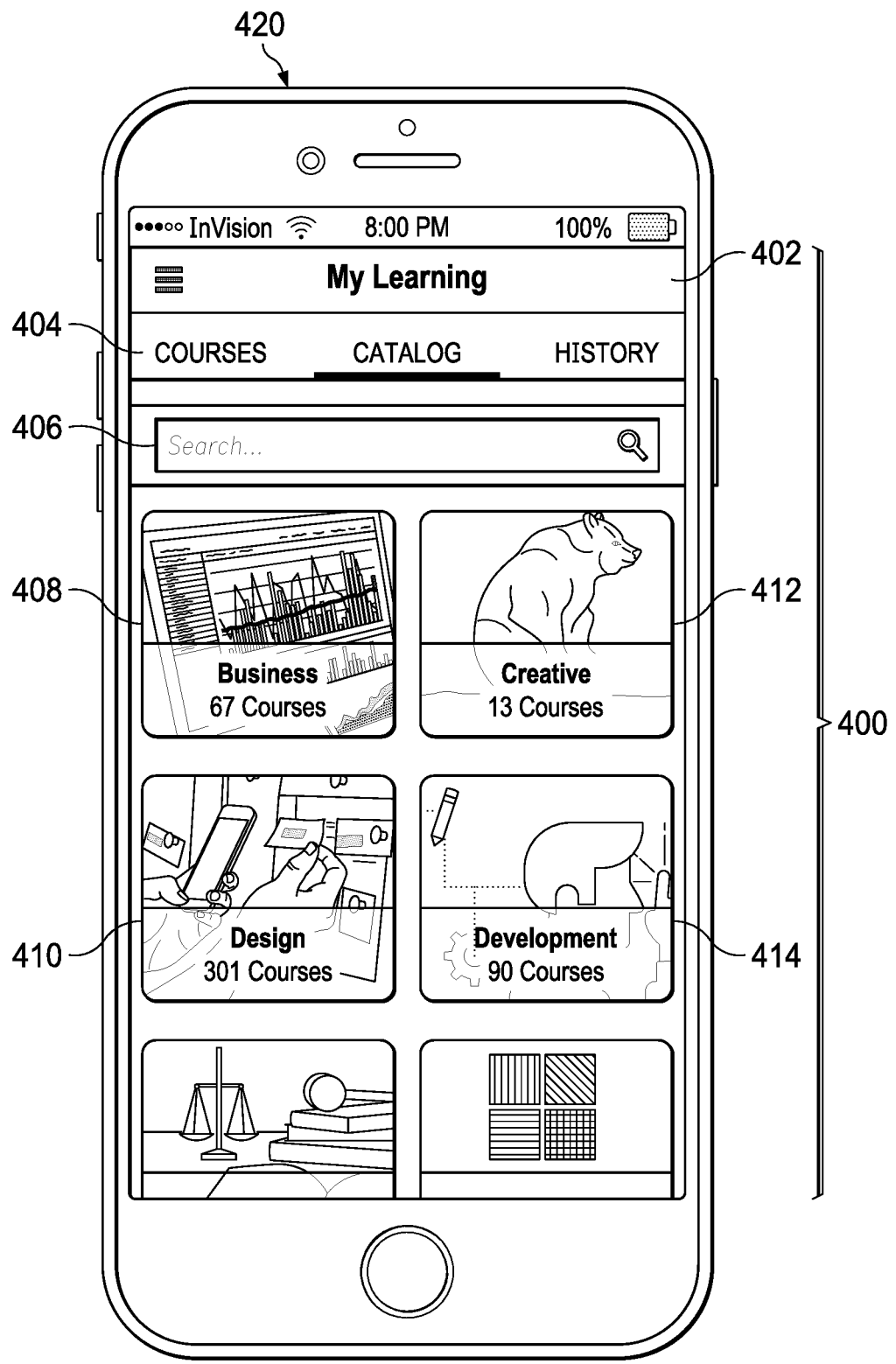
FIG. 4 is an illustration of an interface display of home page of a mobile learning catalog in accordance with an illustrative embodiment.

FIG. 4 is an illustration of an interface display of home page of a mobile learning catalog in accordance with an illustrative embodiment. Interface 400 is displayed on mobile phone 420, which might be an example of a network client device 110 in FIG. 1 and mobile device 224 in FIG. 2.

Page 402 in interface 400 includes a menu bar 404 at the top that allows the user to select, e.g., all courses, a catalog view, and history. In the present example, the user is viewing a view of the catalog. Below the menu bar 404 is a search field 406 that allows the user to directly search for a specific course.

As shown in FIG. 4, the catalog view includes the different subject topics available in the catalog and the number of courses available for that topic. In the present example, the catalog includes 67 courses under Business 408, 301 courses under Design 410, 13 courses under Creative 412, and 90 courses under Development 414. The user can scroll down page 402 to see other topics in the catalog.

Figure 5:
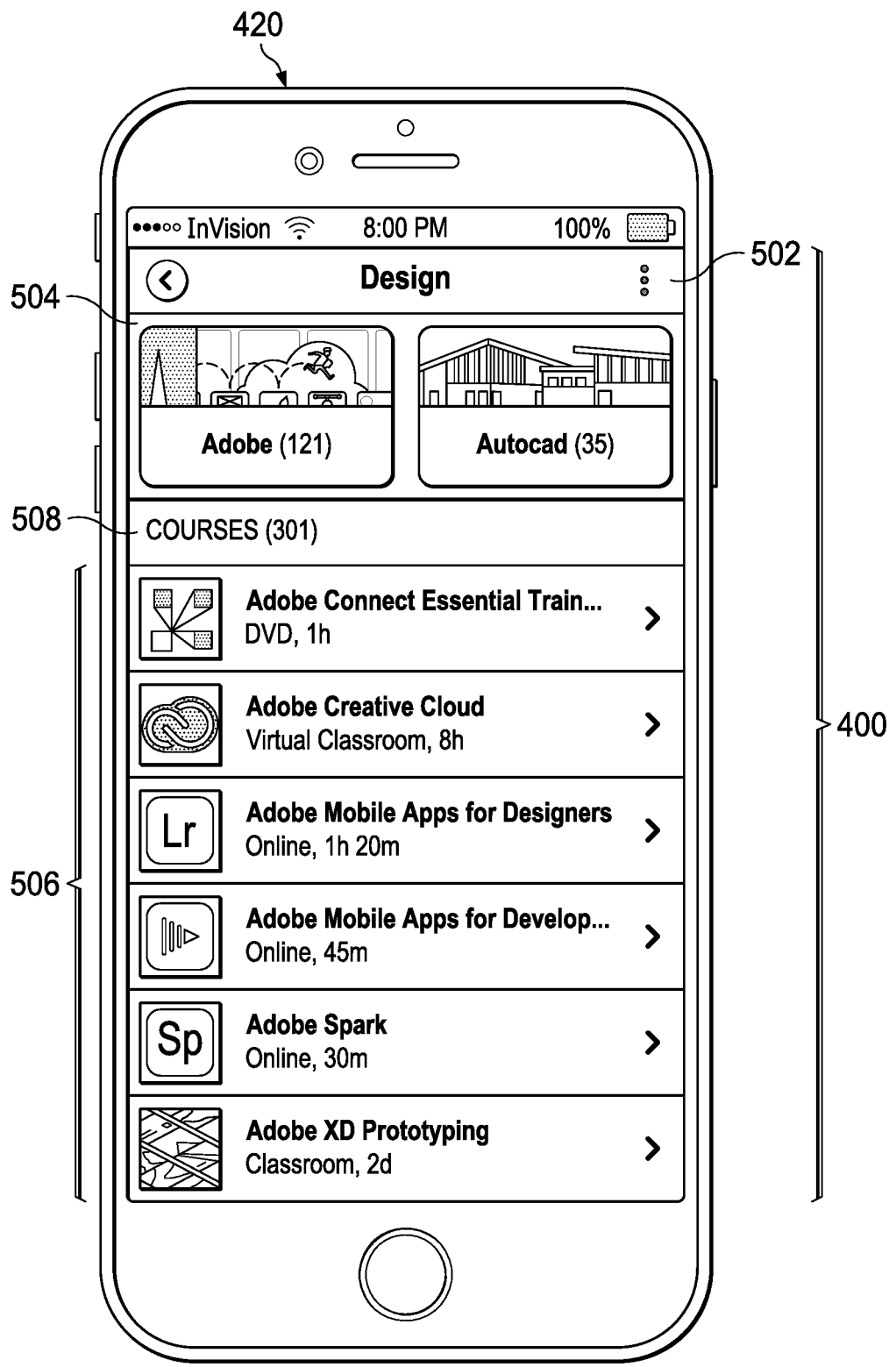
FIG. 5 is an illustration of an interface display of courses available under a specific topic in accordance with an illustrative embodiment.

FIG. 5 is an illustration of an interface display of courses available under a specific topic in accordance with an illustrative embodiment. In the present example, page 502 displays the courses that are available if the user selects Design 410 on page 402.

At the top of page 502 is a carousel menu 504 that visually display the folders in a horizontally scrollable carousel with the items within the selected folder. On page 502, carousel menu 504 organizes the design courses according to specific software brands. In the example shown, there are 121 courses for Adobe® software products and 35 course for AutoCAD® software products.

In addition to carousel menu 504, page 502 also comprises a complete list 506 of all individual design courses in the Design folder through which the user can scroll vertically. At this level in the file structure, course count 508 lists the total number of courses (301) that are included in list 506.

Figure 6:
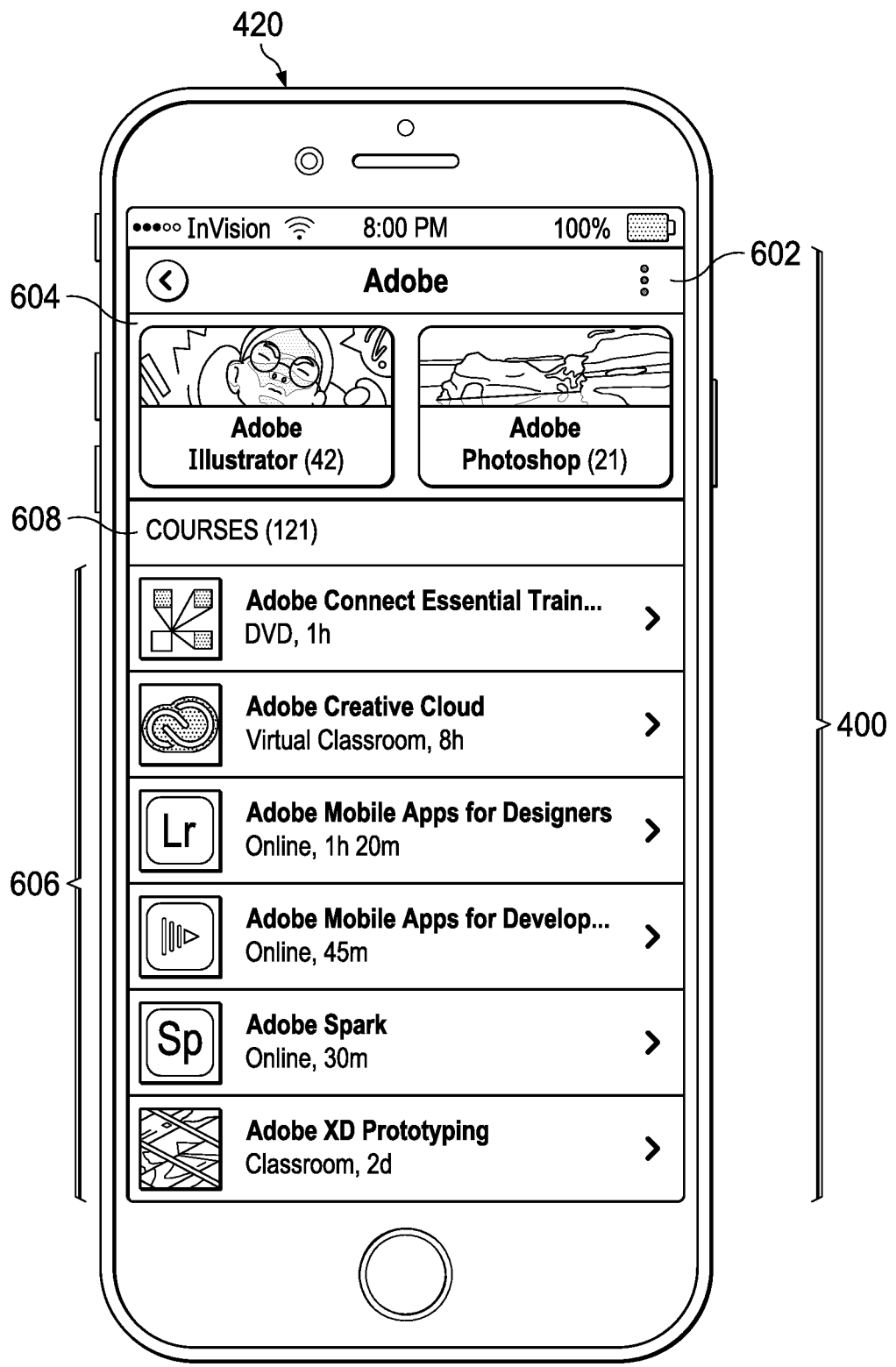
FIG. 6 is an illustration of an interface display of courses available for specific brands of software in accordance with an illustrative embodiment.

FIG. 6 is an illustration of an interface display of courses available for specific brands of software in accordance with an illustrative embodiment. In the present example, page 602 displays the courses that are available if the user selects Adobe® products from carousel menu 504 in FIG. 5.

On page 602, carousel menu 604 organizes courses according to specific Adobe® products (or specific products of whichever brand of software is selected from page 502). List 606 includes all courses available in the folder for the selected software brand (in this example, Adobe®). As can be seen, the total course count 608 is 121, reflecting the total number of Abode® courses.

Figure 7:
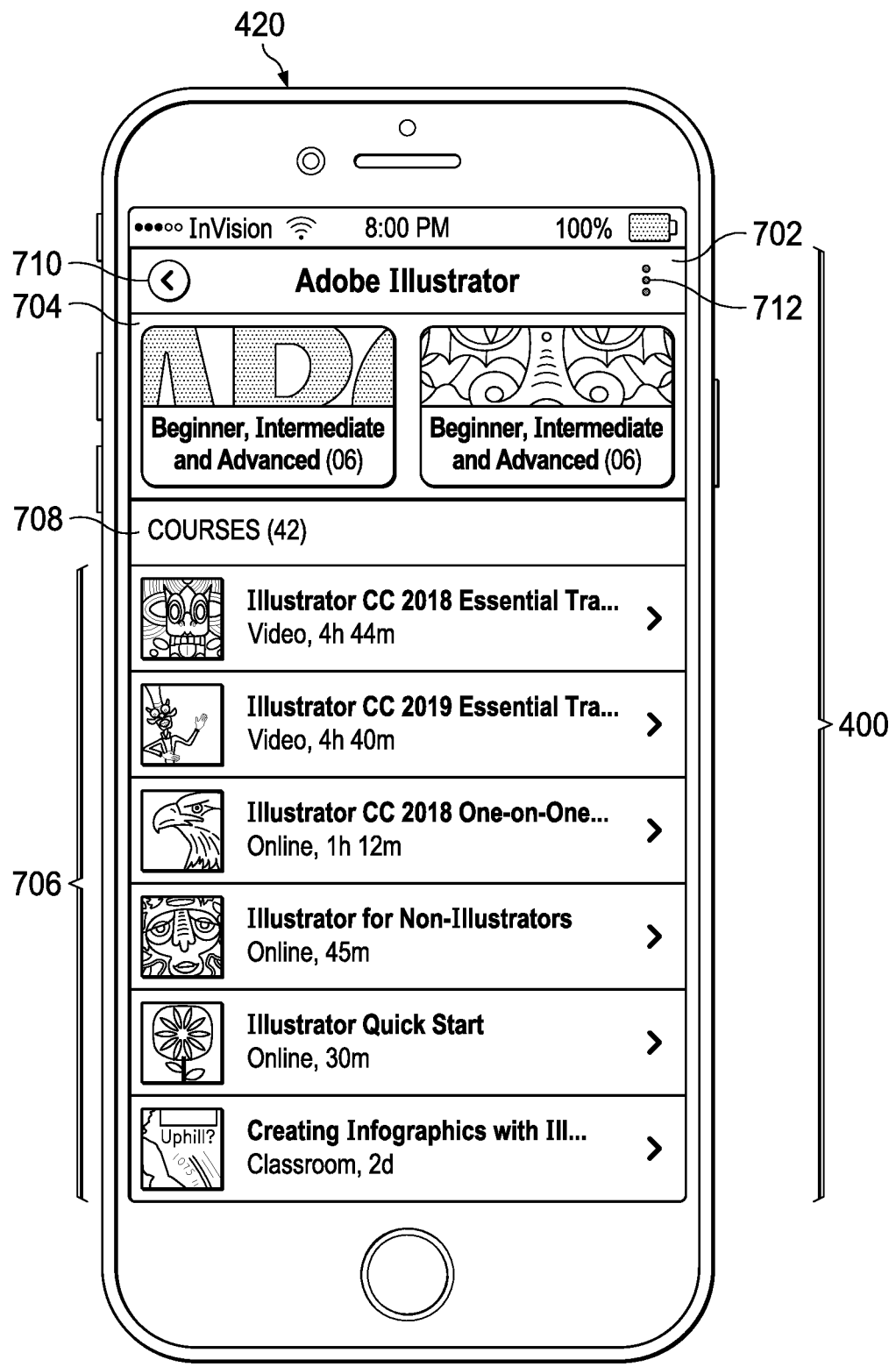
FIG. 7 is an illustration of an interface display of courses available for a specific software product in accordance with an illustrative embodiment.

FIG. 7 is an illustration of an interface display of courses available for a specific software product in accordance with an illustrative embodiment. In the present example, page 702 displays the courses that are available for Adobe Illustrator®, selected from carousel menu 604 in FIG. 6. The carousel menu 704 at the top of page 702 organizes the courses for Adobe Illustrator®, each of which includes Beginner, Intermediate, or Advanced levels.

List 706 displays all courses that the user might select in the Adobe Illustrator® folder. List 706 also displays the format and duration of each course. Course count 708 shows the total number of courses available for this specific software product, which in this example is 42 courses (as also indicated in carousel menu 604 in FIG. 6).

Also shown in FIG. 7 (as well as in FIGS. 5 and 6) is a back-navigation button 710 that allows the user to navigate back through previously selected folders/pages sequentially. However, if the user does not wish to navigate back sequentially, interface 400 also includes a "kabab" style menu button 712 that allows the user to call up an action sheet, shown in FIG. 8.

Figure 8:
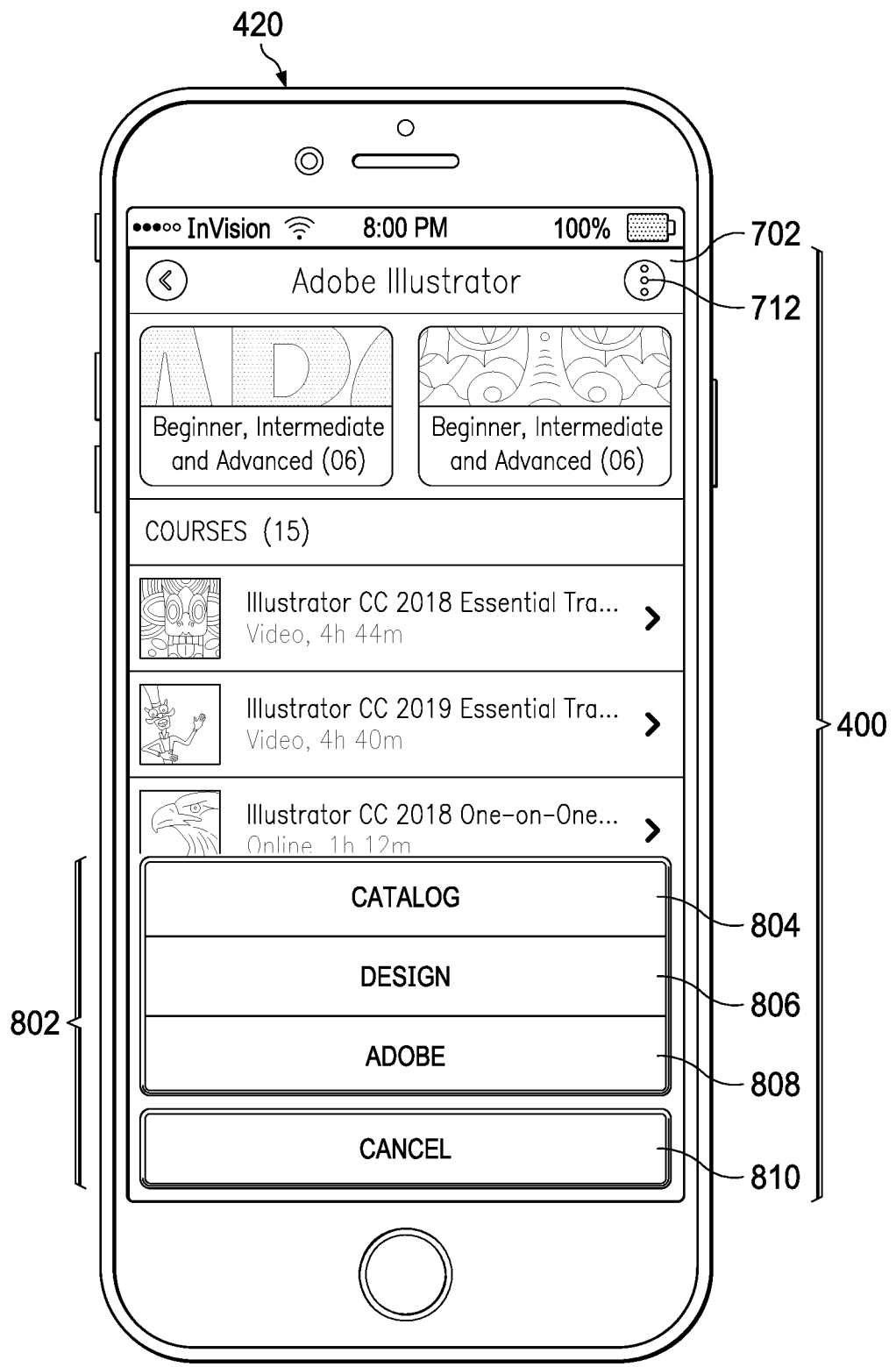
FIG. 8 is an illustration of an action sheet for back navigation in an interface display in accordance with an illustrative embodiment.

FIG. 8 is an illustration of an action sheet for back navigation in an interface display in accordance with an illustrative embodiment. In this example, user selection of the kabob menu button 712 calls up action sheet 802. Action sheet 802 might be an example of action sheet 236 in FIG. 2.

Action sheet 802 comprises a number of navigation options 804-808, that provides navigations options to each folder in the traveled tree and thus is specific to the level within the hierarchical file structure represented by the current page being viewed. In FIG. 8, which shows the page 702 listing courses for a specific product, the navigation choices in action sheet 802 allow the user to navigate directly to the brand (i.e. Adobe) file level 808, the topic file level (i.e. Design) 806, and the catalog home page level 804. Action sheet 802 also has the option to cancel 810 the back navigation.

Figure 9:
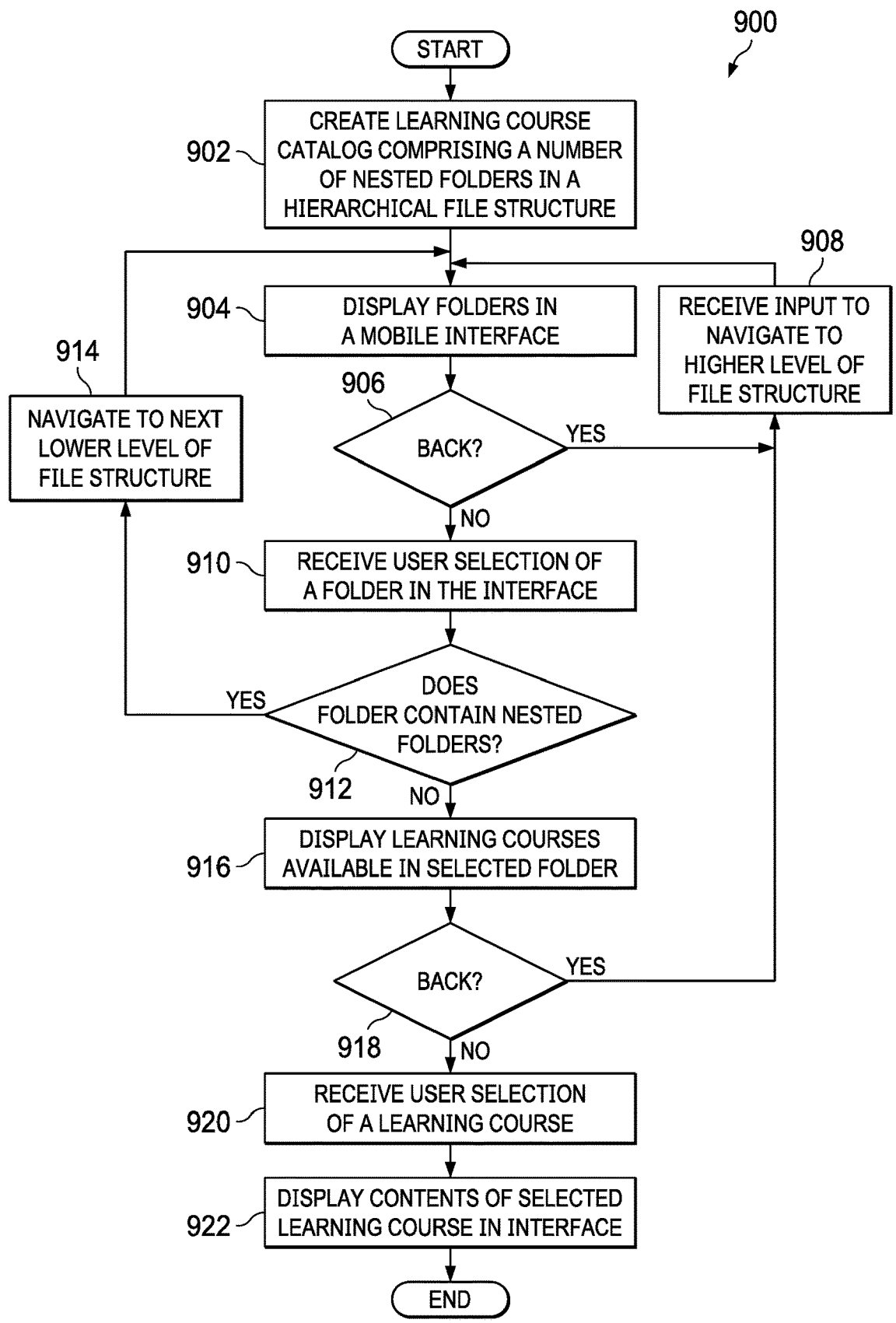
FIG. 9 is an illustration of a flowchart for a process of providing mobile learning courses in accordance with an illustrative embodiment

FIG. 9 is an illustration of a flowchart for a process of providing mobile learning courses in accordance with an illustrative embodiment. Process 900 might be implemented with mobile learning system 200 in FIG. 2 and use mobile interface such as interface 400 shown in FIGS. 4-8. Process 900 begins by creating a catalog of a number of learning courses, wherein each learning course comprises a number of nested folders within a hierarchical file structure containing course content (step 902).

The folders comprising the catalog are displayed in a mobile interface (step 904). The specific folders shown in the interface depend on the current level in the file structure selected by the user, for example, as shown in FIGS. 4-7.

With the exception of the initial home page of the catalog, the user has the option to select a folder and move to a lower level in the hierarchical file structure or go back (step 906). If the user chooses to go back, an input is received to navigate to a higher level in the file structure (step 908) and display the folders at the level.

If the user chooses to go forward, a user selection is received for one of the displayed folders in the interface (step 910). The system determines if there are nested folders within the selected folder (step 912). If there are nested folders in the selected folder, the system navigates to the next lower level in the file structure (step 914) and displays the folders in the interface.

If there are no nested folders in the selected folder, the system displays learning courses that are available in the selected folder (step 916). Again, the user has the option to navigate back or select one of the displayed learning courses (step 918). If the user does not want to take any of the displayed courses and chooses to go back, an input is received to navigate to a higher level in the file structure (step 908) and display the folders at the level.

If the user does choose one of the displayed courses, a user selection of a learning course is received through the interface (step 920), and the course content for the selected course is displayed in the interface (step 922). Process 900 then ends. The steps in process 900 can be repeated if the user chooses to take another course.

Figure 10:
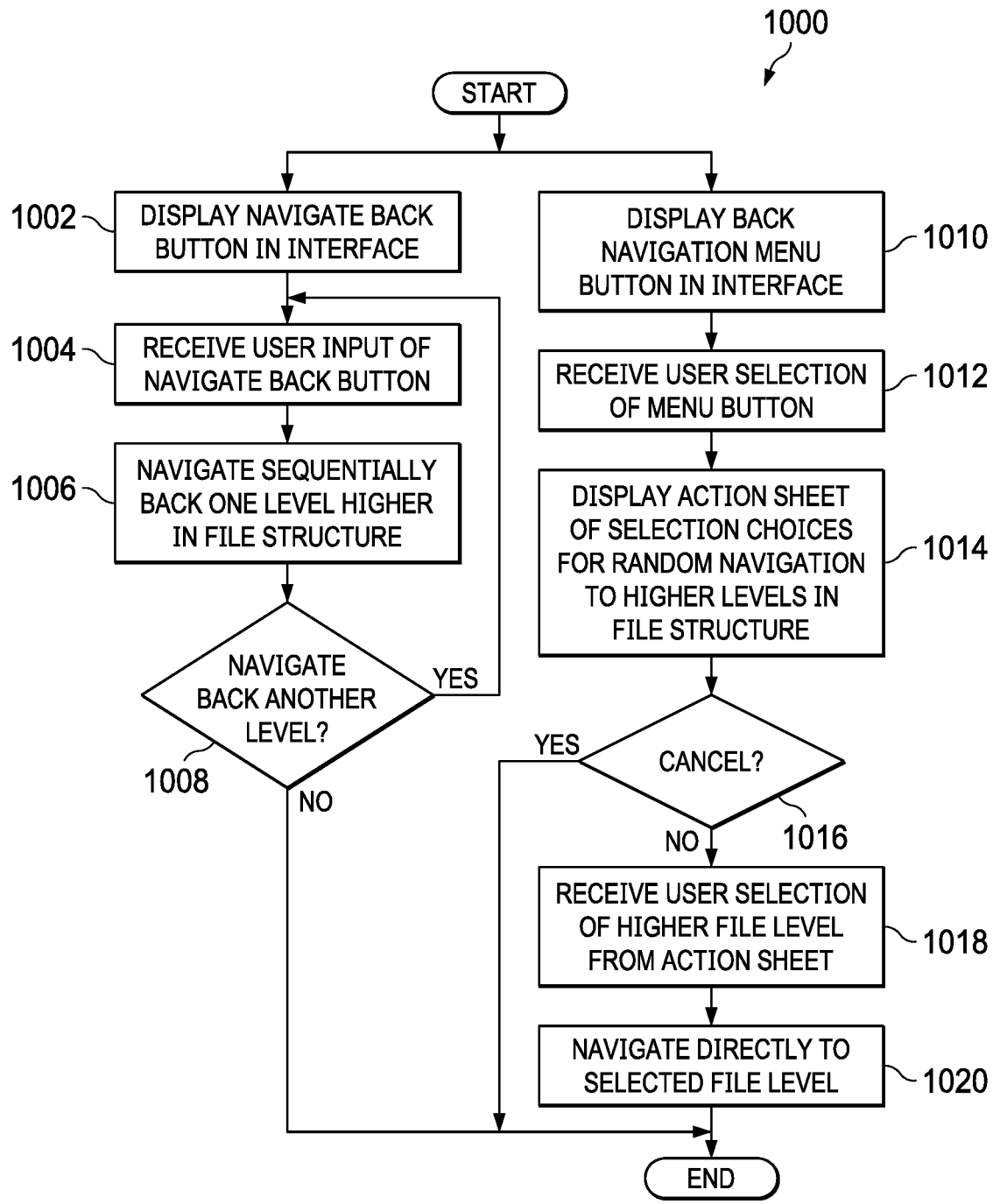
FIG. 10 is an illustration of a flowchart for navigating back through the catalog hierarchical file structure in accordance with an illustrative embodiment.

FIG. 10 is an illustration of a flowchart for navigating back through the catalog hierarchical file structure in accordance with an illustrative embodiment. Process 1000 is an example of a more detailed description of step 908 in FIG. 9. As explained above, to navigate back up the hierarchical file structure of nested folders, the user has the option of navigating sequentially or randomly to higher file levels.

To provide the user with a choice of navigation method, the system displays a navigate back button, e.g., button 710, in the interface (step 1002). Concurrently, the system also displays a back navigation menu button in the interface (step 1010). For example, the menu button might be a kabob style, three-dot button like button 712 in FIG. 7.

If the user chooses the navigate back sequentially, a user input of the navigate back button is received (step 1004). The system then navigates sequentially back one level higher in file structure (step 1006). The user has the option to continue navigating back sequentially to yet a higher file lever or stop (step 1008).

If the user chooses to navigate back randomly, a user selection of menu button is receive (step 1012). In response to selection of the menu button, the system displays an action sheet of selection choices for random navigation to higher levels in file structure (step 1014). The action sheet might be, e.g., action sheet 802 in FIG. 8. The action sheet might include on option for the user to cancel the navigation back (step 1016).

If the user chooses not to cancel, the system receives user selection of higher file level from the action sheet (step 1018) and navigates directly to selected file level (step 1020). Process 1000 then ends.

The process steps in FIG. 10 might be applied to a user navigating back to previous questions during an exam for one of the learning courses.

Figure 11:
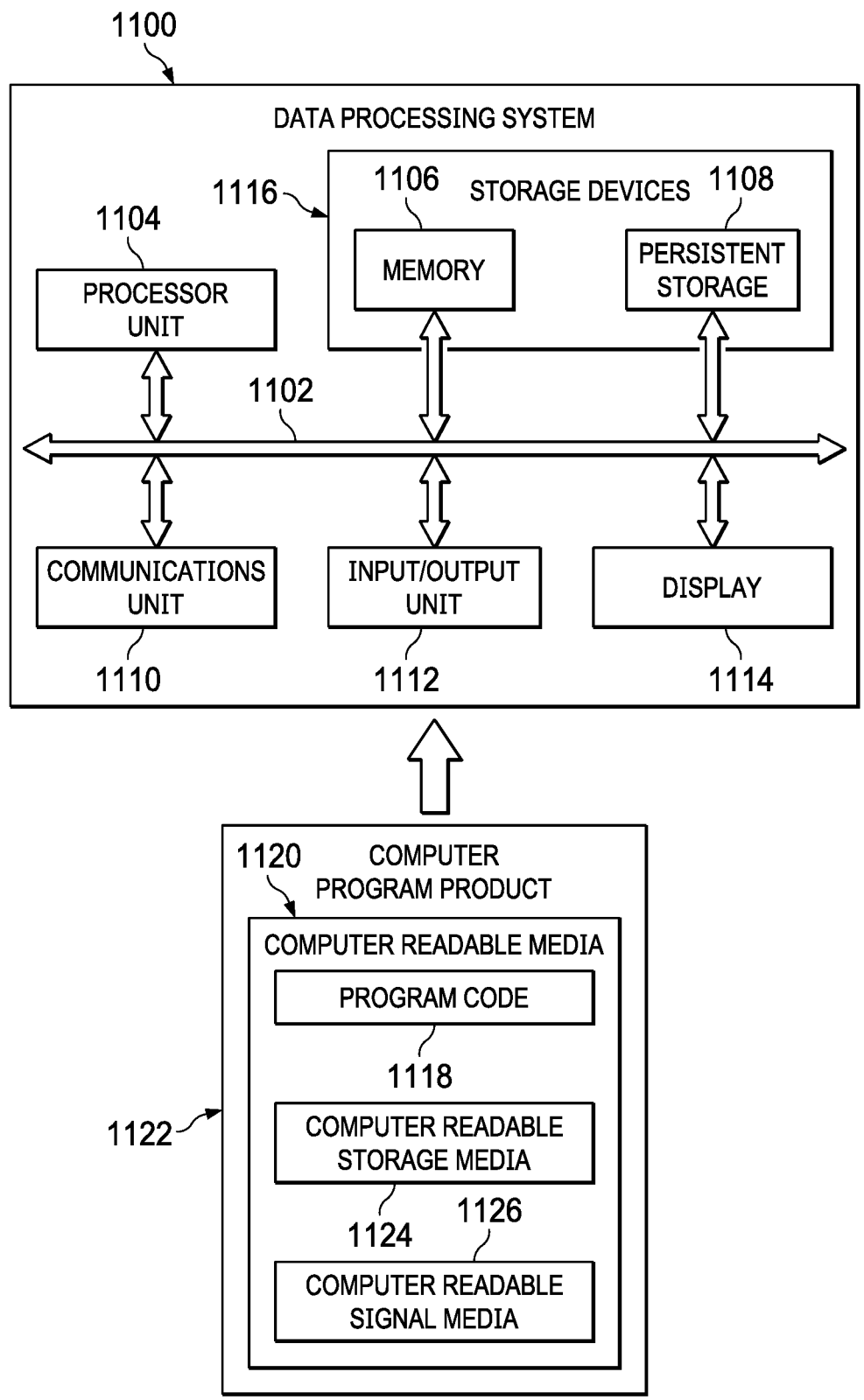
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement one or more client devices 110 in FIG. 1. In this illustrative example, data processing system 1100 includes communications framework 1102, which provides communications between processor unit 1104, memory 1106, persistent storage 1108, communications unit 1110, input/output unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation. In an embodiment, processor unit 1104 comprises one or more conventional general-purpose central processing units (CPUs). In an alternate embodiment, processor unit 1104 comprises one or more graphical processing units (CPUs).

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1116, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108. Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer-usable program code, or computer-readable program code that may be read and executed by a processor in processor unit 1104. The program code in the different embodiments may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples. In one example, computer-readable media 1120 may be computer-readable storage media 1124 or computer-readable signal media 1126.

In these illustrative examples, computer-readable storage media 1124 is a physical or tangible storage device used to store program code 1118 rather than a medium that propagates or transmits program code 1118. Alternatively, program code 1118 may be transferred to data processing system 1100 using computer-readable signal media 1126.

Computer-readable signal media 1126 may be, for example, a propagated data signal containing program code 1118. For example, computer-readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

Further, as used herein, "computer-readable media 1120" can be singular or plural. For example, program code 1118 can be located in computer-readable media 1120 in the form of a single storage device or system. In another example, program code 1118 can be located in computer-readable media 1120 that is distributed in multiple data processing systems. In other words, some instructions in program code 1118 can be located in one data processing system while other instructions in program code 1118 can be located in one data processing system. For example, a portion of program code 1118 can be located in computer-readable media 1120 in a server computer while another portion of program code 1118 can be located in computer-readable media 1120 located in a set of client computers.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The illustrative embodiments provide method for predicting changes in customer demand. The method comprises collecting subscription data for a number of customers at specified time intervals, wherein each customer is subscribed to one of a number of defined bundles of services. The method further comprises determining any changes in customer bundle subscriptions during a given time interval, and determining metrics for defined customer tasks for subscribed services during the given time interval. From this data, the method simultaneously models, via multimodal multi-task learning, bundle subscription change events and time-to-event for each bundle subscription change. The method then predicts, according the modeling, types and timing of changes in customer bundle subscriptions based on customer service activities. By predicting both the types of changes in bundles subscriptions and the timing of those changes, the illustrative embodiments allow proactive steps to be taken to assist customers in making changes or to mitigate negative changes. Such proactive steps might comprise targeted marketing or incentive to customers or speeding up changes to bundle subscriptions. The anticipatory, proactive steps can provide cost and time savings for both customers and service providers.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of providing learning content on a mobile device, the method comprising a number of processors performing the steps of:
displaying, on a home page on an interface of the mobile device:
a menu bar for selecting one of: a catalog view, all learning courses, and a history;
a search window for directly navigating to a particular course; and
a majority portion of the interface providing accessibility for displaying an image, respectively for each subject folder in a catalog of all learning courses on the interface on the mobile device, via a control for vertically scrolling the image into the majority portion on the mobile device, such that each image comprises an indication of a number of nested course folders within a displayed subject folder;
designating a selected subject folder via receiving a user selection, through the interface on the mobile device, of the selected subject folder in the catalog of all learning courses, such that the catalog of all learning courses comprises a number of nested subject folders within a hierarchical file structure;
responsive to the selected subject folder containing nested course folders:
replacing the menu bar and the search window with:
a horizontal scroll carousel menu for providing accessibility for displaying an image respectively for a group of learning course in the selected subject folder;
an indication of a total number of learning courses for all groups of learning courses selectable through the horizontal scroll carousel menu; and
a button for displaying an action sheet;
displaying a list of all of the nested course folders in the majority portion of the interface via selection through a control for vertically scrolling the list;
responsive to the selected subject folder lacking the nested course folders, displaying, in the interface, a number of learning courses in the selected subject folder;
designating a selected learning course via receiving a second user selection, through the interface, of a learning course in the selected subject folder; and
displaying contents of the selected learning course in the interface.

2. The method of claim 1, further comprising:
receiving a selection of a navigation menu button in the interface and displaying a page viewed on the interface immediately prior to a current page;
receiving a selection of the button, and displaying the action sheet as an overlay on the interface, wherein the action sheet comprises a number of navigation choices for higher levels in the hierarchical file structure.

3. The method of claim 2, wherein the action sheet allows random navigation back to higher levels in the hierarchical file structure.

4. The method of claim 1, wherein each learning course in the number of learning courses further comprises an exam.

5. The method of claim 4, wherein navigation back to previous questions in the exam is performed via an action sheet, wherein the action sheet allows random navigation to the previous questions.

6. The method of claim 1, wherein each course folder in the list displayed on the interface represents a brand of a course provider.

7. The method of claim 1, wherein each course folder in the list displayed on the interface further represents a specific product.

8. A system configured to provide learning content on a mobile device, such that the system comprises:
a storage device configured to store program instructions; and
one or more processors operably connected to the storage device and configured to execute the program instructions that cause the system to:
display, on a home page on an interface of the mobile device:
a menu bar for selecting one of: a catalog view, all learning courses, and a history;
a search window for directly navigating to a particular course; and
a majority portion of the interface configured to provide access to display an image, respectively for each subject folder in a catalog of all learning courses on the interface on the mobile device, via a control for vertically scrolling the image into the majority portion on the mobile device, such that each image comprises an indication of a number of nested course folders within a displayed subject folder;
designate a selected subject folder based upon receipt of a selection, through an interface on the mobile device, of the selected subject folder in the catalog of all learning courses, such that the catalog of all learning courses comprises a number of nested subject folders within a hierarchical file structure; determine if the selected folder contains nested folders;
responsive to the selected subject folder containing nested course folders:
replace the menu bar and the search window with:
a horizontal scroll carousel menu configured to access to display an image respectively for a group of learning course in the selected subject folder;
an indication of a total number of learning courses for all groups of learning courses selectable through the horizontal scroll carousel menu; and
a button configured to display an action sheet;
display a list of all of the nested course folders in the majority portion of the interface via selection through a control for vertically scrolling the list;
responsive to a void of nested folders in the selected folder, display, in the interface, a number of learning courses in the selected folder;
designate a selected learning course based upon a selection, through the interface, of a learning course in the selected folder; and
display contents of the selected learning course in the interface.

9. The system of claim 8, further comprising the processors configured to execute instructions that cause the system to:
receive a selection of a navigation menu button in the interface; and in response to the selection of the navigation menu button, display an action sheet in the interface, wherein the action sheet comprises a number of navigation choices that allow random navigation back to higher levels in the hierarchical file structure.

10. The system of claim 8, wherein each learning course in the number of learning courses further comprises an exam.

11. The system of claim 10, further comprising an action sheet configured for random navigation back to previous questions in the exam.

12. The system of claim 8, wherein the interface further comprises a scrollable carousel menu of nested folders in the selected folder.

13. The system of claim 8, wherein the interface further comprises a scrollable carousel menu of learning courses in the selected folder.

14. A computer program product configured to provide a learning content on a mobile device, such that the computer program product comprises:
- a non-volatile computer readable storage medium that comprises program instructions stored thereon and configured to:
  - display, on a home page on an interface of the mobile device:
    - a menu bar for selecting one of: a catalog view, all learning courses, and a history;
    - a search window for directly navigating to a particular course; and
    - a majority portion of the interface configured to provide access to display an image, respectively for each subject folder in a catalog of all learning courses on the interface on the mobile device, via a control for vertically scrolling the image into the majority portion on the mobile device, such that each image comprises an indication of a number of nested course folders within a displayed subject folder;
  - designate a selected folder based upon receipt of a selection, through an interface on the mobile device, of the selected subject folder in the catalog of all learning courses, such that the catalog of learning courses comprises a number of nested folders within a hierarchical file structure;
  - responsive to the selected folder subject folder containing nested course folders:
    - replace the menu bar and the search window with:
      - a horizontal scroll carousel menu configured to access to display an image respectively for a group of learning course in the selected subject folder;
      - an indication of a total number of learning courses for all groups of learning courses selectable through the horizontal scroll carousel menu; and
      - a button configured to display an action sheet;
    - display a list of all of the nested course folders in the majority portion of the interface via selection through a control for vertically scrolling the list;
  - responsive to a void of nested folders in the selected folder, display in the interface, a number of learning courses in the selected folder;
  - designate a selected learning course based upon receipt of, through the interface, a selection of a learning course in the selected folder; and
  - display contents of the selected learning course in the interface.

15. The computer program product of claim 14, further comprising instructions configured to:
- receive a selection of a navigation menu button in the interface; and
- in response to the selection of the navigation menu button, display an action sheet in the interface, wherein the action sheet comprises a number of navigation choices for higher levels in the hierarchical file structure.

16. The computer program product of claim 15, wherein the action sheet allows random navigation back to higher levels in the hierarchical file structure.

17. The computer program product of claim 15, wherein each learning course in the number of learning courses further comprises an exam.

18. The computer program product of claim 17, wherein navigation back to previous questions in the exam is performed via the action sheet, wherein the action sheet allows random navigation to the previous questions.

19. The computer program product of claim 15, wherein the interface further comprises a scrollable carousel menu of nested folders in the selected folder.

20. The computer program product of claim 15, wherein the interface further comprises a scrollable carousel menu of learning courses in the selected folder.

* * * * *